US005567926A

United States Patent [19]

Asher et al.

[11] Patent Number: 5,567,926

[45] Date of Patent: Oct. 22, 1996

[54] MINIBAR SYSTEM

[75] Inventors: Amram Asher, Sitriya; Nathan Lahav, Zichron Yaacov, both of Israel

[73] Assignee: Tadiran Appliances Ltd., Tel-Aviv, Israel

[21] Appl. No.: 456,041

[22] Filed: Feb. 8, 1993

Related U.S. Application Data

[63] Continuation-in-part of Ser. No. 651,434, Feb. 7, 1991, abandoned.

[51] Int. Cl.$^{6}$ .......... G06K 5/00

[52] U.S. Cl. .......... 235/382; 235/375; 235/381

[58] Field of Search .......... 235/375, 382, 235/381

[56] References Cited

U.S. PATENT DOCUMENTS 3,836,755 9/1974 Ehrat .......... 235/383
4,883,948 11/1989 Sunyich .
4,891,755 1/1990 Asher .
5,038,023 8/1991 Saliga .

*Primary Examiner*—Harold Pitts
*Attorney, Agent, or Firm*—Keck, Mahin & Cate

[57] ABSTRACT

A system for operating minibars in hotel rooms based on a plurality of individual minibars, one in each of the hotel rooms, each of which is equipped with means for reading an electronic card coded for each hotel guest or according to the credit card of a guest, thus enabling the guest to open the minibar, a central computer which receives information on each opening of the individual minibar, and which can be used to deny access to such minibar when a reason for this exists. The system can also comprise means for monitoring the cooling of each minibar. The main computer stores data on each individual access to the minibar by each guest and facilitates the presentation of a list of charges to the guest checking out from the hotel.

14 Claims, 1 Drawing Sheet

MINIBAR SYSTEM

REFERENCE TO RELATED APPLICATIONS

Figure 1:
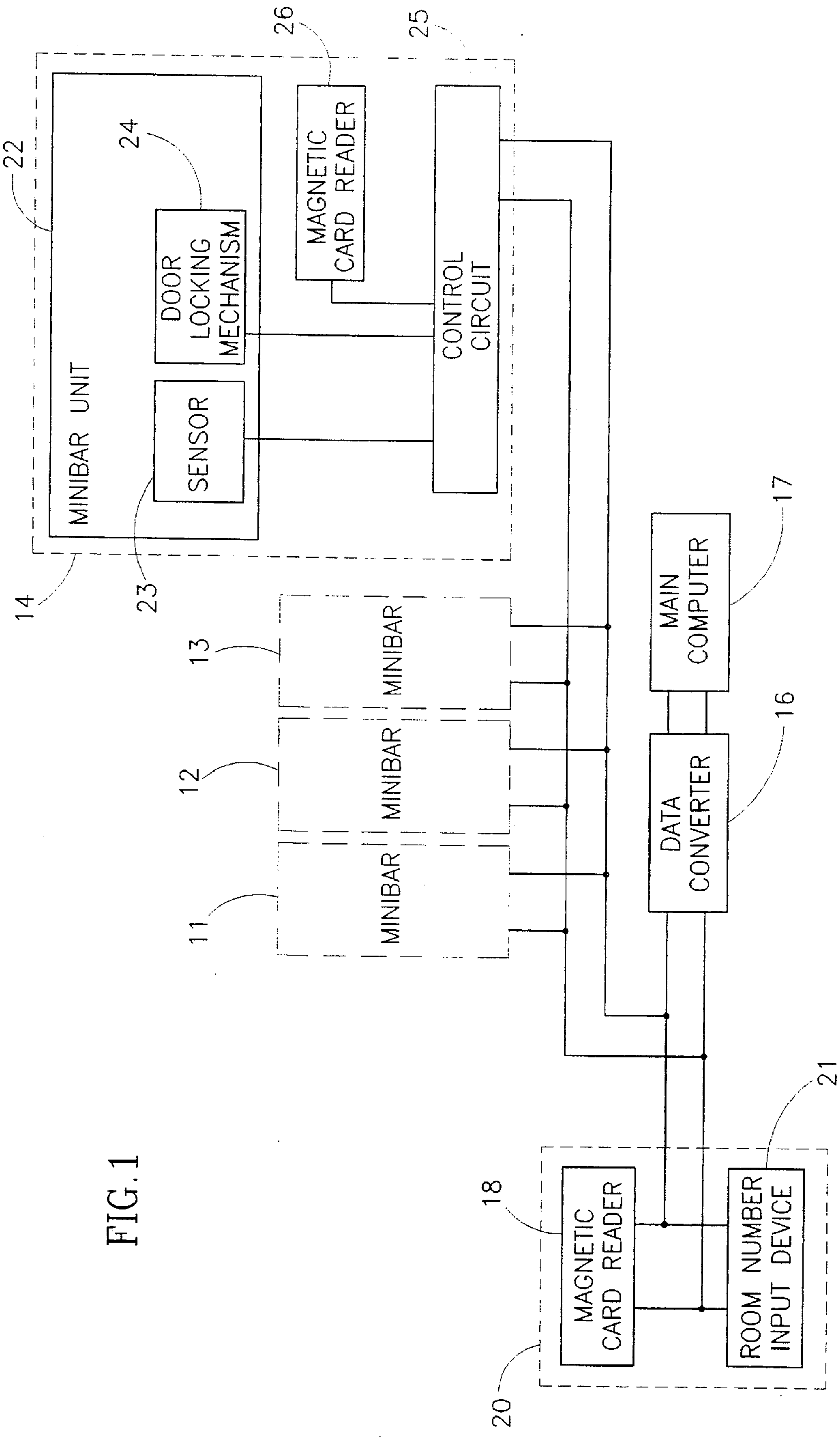

This application is a cotinuation-in-part of Ser. No. 07/651,434, Feb. 7, 1991 now abandoned.

FIELD OF THE INVENTION

The invention relates to improvements in refrigerators, and mainly of minibars of the type provided in hotel rooms, where the guest removes certain items, generally a beverage, at his will, and is charged for these with his hotel bill.

BACKGROUND OF THE INVENTION

In most rooms of modern hotels there are provided refrigerators wherein there are stored small bottles of alcoholic beverages, soft drinks and other items, and the hotel guest is provided with a key which enables him to remove any item he desires, and the guest is charged for such items with his hotel bill.

There are also known certain arrangements which indicate at the main desk whether and which type of items have been removed.

There exists, however, the problem of removal of items from the minibar after the guest pays his bill or after an inspection and before he checks out.

SUMMARY OF THE INVENTION

The invention relates to improvements in minibar type refrigerators, used in hotel rooms. According to the invention the hotel guest presents his credit card when he checks in, data is copied and fed to the lock of the minibar in his room, and the guest is provided with a magnetic key for his specific minibar or he is enabled to use his credit card for opening the minibar.

The central control at the main desk is informed each time the minibar is opened, and the main desk is also able to deny access to the minibar whenever this is justified, e.g., after checkout time, when children are in the room, after payment of the final bill etc.

The main feature of the invention is the use of the credit card of the guest in order to provide access to the minibar, either by itself or by a transfer of its code to a specific key provided by the hotel and by coding the minibar according to the data of the credit card of the guest.

Basically the minibar is opened by the use of the individual electronic card of the specific guest of a given room, or by a master key adapted to pen many or all of the minibars in the hotel, enabling replenishment of stocks and checking on items used by the guest.

The minibar can also be provided with one or more sensors, providing information to the central computer as to whether the door of the minibar is open or closed, and whether the cooling mechanism is operating satisfactorily.

When the guest checks out, the code of the individual minibar of his room is changed, thus denying access to the minibar except for servicing personnel, until a new guest, provided with a newly coded electronic card which authorizes access to this minibar.

Thus, the system of the invention comprises a plurality of minibars, located in hotel rooms, each of which contains a computer controlled locking/unlocking device and a magnetic card reader. Insertion or passing the magnetic card results in the opening of the door of the minibar, and when the door is closed, it locks automatically. Each of the minibar units feeds the central computer with all the required data on number of openings of the minibar, on the status of the minibar and grants or denies access to the guest, depending on his status in the hotel; thus after check-out the access code is automatically cancelled and a new one is required for each subsequent guest of the given room.

There can be provided many variations of the system of the invention, which is described by way of example Only with reference to the enclosed drawing, in which Figure 1 is a block diagram of a system the invention.

As shown in this Figure the system includes a plurality of minibars, generally one per hotel room, designated here as 11, 12, 13 and 14. Each of these is connected with the control system, which comprises a reception input system 20 including a card reader 15 and room number input device (e.g. a keyboard, for designating the room/minibar to which the card reader 15 input applies), a data converter 16 and a main computer 17.

Each of the minibars is equipped with a locking mechanism 24 which comprises a motor which activates the lock catch (not shown), a switch which serves as a door open/closed sensor 23, and a magnetic card reader 26. The control circuitry 25 of each minibar comprises a microprocessor unit, capable of communication with the main computer 17.

The main computer 17 includes a monitor. It has two main operating modes:

A. Normal mode—scanning and polling the individual minibars, receiving door open/closed reports and access requests, and sending out access authorizations such as to open minibars after check-in, or denying access after check-out.

B. Installation mode—the computer serves as a technician's tool for system installation.

The card reader 15 is an auxiliary unit to the main computer, allowing it to accept a magnetic card which grants permission to unlock a certain minibar. The unit is similar to the one used in the minibar, but performs additional tasks. There is provided a communication network which consists of a pair of wires which interconnects all system units and is also connected to the main computer's card system units and is also connected to the main computer's card reader. Data can be transferred in RS485 form. The same pair of wires is connected to a converter 16 (preferably being a microprocessor for conveying pertinent data to main computer 17), which can transform the data into RS232 form and feed them to the main computer's serial input. Typically, each minibar is connected to a PC (i.e., the main computer 17) via a group control unit (GCU) using a RS485 multidrop communication standard, the computer 17 and minibars being connected with a pair of telephone wires free of other use.

In its normal state, the minibar is locked. It can be unlocked

By the authorized user

By service personnel using a master card.

As soon as the door is opened, a timer is activated, and if the door is not closed within a given time, a brief alarm sounds.

Upon door closure (before or after the alarm) the minibar is automatically relocked.

The hotel guest of the given room may unlock the minibar if his check-in process has been run in the main computer. Thus, when a guest arrives, he is asked for his credit card, which is passed through card reader 15; if the card is in order, the card code is programmed in the hotel's computer for that guest's access to the minibar in his assigned room. The first card read by the minibar after check-in is retained in memory as the "user's card". Only this card will permit subsequent unlocking of the minibar until the check-out process has been run in the main computer.

The minibar's control circuitry 25 reports to the main computer 17 all door opening or closing actions as well as master card reassignments and the master card will unconditionally open any minibar. For door opening, one has to slide the card along the card reader's 26 slot or provide for another electronic scan.

The following is an outline of the main computer operation.

When switched on, the LOGO will appear on the screen. Pressing ENTER will cause the main menu to appear.

Main menu selections:

Check-in

Check-out

Operational status

Check-in procedure:

(1) Select CHECK-IN on the main menu
(2) Select the desired room number
(3) Pass a user's card in the card reader 15
(4) Press any key to complete data transfer.

Check-out procedure:

(1) Select CHECK-OUT on the main menu
(2) Select the desired room number

Operational Status:

(1) IF OPERATIONAL STATUS is selected on the main menu, there are two options:
General status and communication with remote units
Single room status
(2) General status provides information on the number of door openings in all the rooms since the last replenishment.
(3) Single room status details all events since the last replenishment.

We claim:

1. A computerized system for the operation of minibar units located in a plurality of hotel rooms, comprising in combination a central computer-control unit connected with each of the minibars, means for coding the lock of a given minibar upon the check-in of a hotel guest according to his credit card and for providing an identical code at the control unit, or for providing the guest with an electronic card having an individual access code, so as to enable the guest to open the minibar whenever desired by inserting his credit card or access card into a suitable opening in the minibar, and means for denying further access by such guest by a command issued by the control unit upon check-out of the guest or for any other compelling reason, there being provided a master card suited for the opening of a number of minibars, for use of servicing personnel.

2. A system according to claim 1, where the minibar is provided with a sensor indicating to the control unit important parameters as to the operation of the minibar.

3. A system according to claim 2, where the indication is of whether the minibar is cooling or whether the door is open or closed.

4. A system according to claim 1, where the control unit is informed automatically upon each opening of the door of the minibar.

5. A computerized system for the operation of minibar units located in a plurality of hotel rooms, comprising in combination an electronic locking means attached to each minibar for locking or unlocking each minibar and controlling access to each said minibar, a central control unit connected with each of the locking means for controlling and monitoring the locking means, electronic coding means connected to the control unit for inputting a first access code for use in controlling a first locking means of a first minibar, and a minibar access code input means for each minibar unit, each minibar access code input means being connected to the central control unit for inputting and communicating a further access code to the central control unit, wherein if a further access code input at the access code input unit of the first minibar is identical to the first access code the main control unit controls the first locking means to unlock the first minibar.

6. The system of claim 5, further comprising an access denial means connected to the central control means for controlling the first locking means to leave the first minibar locked when a further access code is input at the access code input unit of the first minibar that is identical to the first access code.

7. The system of claim 5, further comprising a plurality of processors means, each processor means bring connected to the central control unit and to the locking means and access code input means of one of the minibars for controlling and monitoring the locking means, wherein if the first and further access code are identical the processor means connected to the first locking means controls the first locking means to unlock the first minibar.

8. The system of claim 5, wherein the electronic coding means comprises a magnetic card reader for inputting a code from a guest's magnetic card as the first access code and a room number input means for inputting a room number for use in designating which one of the minibars will open in response to an input of said first access code at the minibar access code input means of said one of the minibars.

9. The system of claim 8, wherein the minibar access code input means comprises a magnetic card reader for inputting the code from the guest's magnetic card as the further access code.

10. The system of claim 9, further comprising a master magnetic card containing a master access code, wherein the master magnetic card will open a plurality of minibars.

11. The system of claim 5, wherein the central control unit is a computer.

12. The system of claim 5, wherein each minibar further comprises a sensor means connected to the central control unit for communicating operational parameters of the minibar to the central control unit.

13. The system of claim 12, wherein the sensor means is a temperature sensor.

14. The system of claim 12, wherein the sensor means is a sensor for communicating each opening and closing of a door of the minibar.

* * * * *